(12) United States Patent
Nelson et al.

(10) Patent No.: US 10,063,603 B2
(45) Date of Patent: Aug. 28, 2018

(54) METHOD AND SYSTEM FOR CONCURRENT COLLABORATIVE UNDO OPERATIONS IN COMPUTER APPLICATION SOFTWARE

(71) Applicant: LiveLoop, Inc., Wilmington, DE (US)

(72) Inventors: David Lee Nelson, Redmond, WA (US); Erin Rebecca Rhode, San Francisco, CA (US); Adam Davis Kraft, Somerville, MA (US); Amal Kumar Dorai, San Francisco, CA (US)

(73) Assignee: LIVELOOP, INC, Wilmington, DE (US)

( * ) Notice: Subject to any disclaimer, the term of this patent is extended or adjusted under 35 U.S.C. 154(b) by 230 days.

(21) Appl. No.: 14/966,676

(22) Filed: Dec. 11, 2015

(65) Prior Publication Data

US 2016/0173543 A1    Jun. 16, 2016

(51) Int. Cl.
| | |
|---|---|
| *G06F 15/16* | (2006.01) |
| *H04L 29/06* | (2006.01) |
| *G06F 17/22* | (2006.01) |
| *G06F 17/24* | (2006.01) |
| *G06F 17/30* | (2006.01) |
| *H04L 29/08* | (2006.01) |

(52) U.S. Cl.
CPC ........ *H04L 65/403* (2013.01); *G06F 17/2288* (2013.01); *G06F 17/24* (2013.01); *G06F 17/30174* (2013.01); *H04L 67/1095* (2013.01)

(58) Field of Classification Search
CPC ............... H04L 65/403; H04L 67/1095; G06F 17/2288; G06F 17/24; G06F 17/30174
See application file for complete search history.

(56) References Cited

U.S. PATENT DOCUMENTS

| | | | |
|---|---|---|---|
| 7,792,788 B2 | 9/2010 | Melmon et al. | |
| 8,209,603 B2* | 6/2012 | Bailor | G06F 17/24 |
| | | | 711/132 |
| 8,738,706 B1 | 5/2014 | Grieve et al. | |
| 2009/0013267 A1* | 1/2009 | Cudich | G06F 17/21 |
| | | | 715/762 |
| 2014/0075323 A1* | 3/2014 | Takamura | H04L 41/22 |
| | | | 715/736 |
| 2015/0058753 A1* | 2/2015 | Anderson | G06F 3/04812 |
| | | | 715/753 |

(Continued)

FOREIGN PATENT DOCUMENTS

CN    104462037 A    3/2015

OTHER PUBLICATIONS

PCT International Preliminary Report on Patentability Issued in PCT Application No. PCT/US2015/065386, dated Mar. 17, 2017, 12 Pages.

(Continued)

*Primary Examiner* — Jonathan A Bui
(74) *Attorney, Agent, or Firm* — Merchant & Gould P.C.

(57) ABSTRACT

Multi-user real-time collaborative software applications may synchronize data between multiple users or multiple devices. Current aspects describe a method and system for enabling undo operations in collaborative software applications where not all possible actions adhere to the operational transformation properties. Certain aspects herein operate in the absence of the so-called Inverse Property 2 (IP2).

18 Claims, 13 Drawing Sheets

(56) References Cited

U.S. PATENT DOCUMENTS

| | | | | |
|---|---|---|---|---|
| 2015/0370757 A1* | 12/2015 | Duns | .................. | G06F 17/212 |
| | | | | 715/229 |
| 2016/0041963 A1* | 2/2016 | Coblenz | ............... | G06F 17/245 |
| | | | | 715/227 |
| 2016/0092418 A1* | 3/2016 | Kraisler | ................. | G06F 17/24 |
| | | | | 715/255 |

OTHER PUBLICATIONS

Ferrie, et al., "Concurrent Undo Operations in Collaborative Environments Using Operational Transformation", In Confederated International Conference in on the Move to Meaningful Internet Systems, CoopIS, DOA, and ODBASE, Oct. 25, 2004, pp. 155-173.

Cherif, et al., "Undo-Based Access Control for Distributed Collaborative Editors", In Proceedings of 6th International Conference on Cooperative Design, Visualization and Engineering, Sep. 20, 2009, pp. 101-108.

Sun, Chengzheng, "Undo as Concurrent Inverse in Group Editors", In ACM Transactions on Computer-Human Interaction, vol. 4, Issue 9, Dec. 9, 2002, pp. 309-361.

Sun, et al., "Optional Locking Integrated with Operational Transformation in Distributed Real-Time-Group Editors", In Proceedings of ACM 18th Symposium on Principles of Distributed Computing, May 4, 1999, pp. 43-52.

Sun, et al., "Context-Based Operational Transformation in Distributed Collaborative Editing Systems", In Proceedings of IEEE Transactions on Parallel and Distributed Systems, vol. 20, Issue 10, Oct. 2009, pp. 1454-1470.

Citro, et al., "Conflict Management for Real-Time Collaborative Editing in Mobile Replicated Architectures", In Proceedings of the thirtieth Australasian conference on Computer science, vol. 62, Jan. 30, 2007, pp. 115-124.

Sun, Chengzheng, "Optional and Responsive Fine-Grain Locking in Internet-Based Collaborative Systems", In Journal of IEEE Transactions on Parallel and Distributed Systems, vol. 13, Issue 9, Sep. 2002, pp. 994-1008.

Sun, Chengzheng, "A Framework for Undoing Actions in Collaborative Systems", In Journal of ACM Transactions on Computer-Human Interaction, vol. 1, Issue 4, Dec. 1994, pp. 295-330.

Li, et al., "A Lightweight Operational Transformation Approach", Retrieved on: Nov. 9, 2015 Available at: http://citeseerx.ist.psu.edu/viewdoc/download?doi=10.1.1.117.7078&rep=repl&type=pdf.

Xue, et al., "An Integrated Post-Locking, Multi-Versioning, and Transformation Scheme for Consistency Maintenance in Real-Time Group Editors", In Proceedings of 5th International Symposium on Autonomous Decentralized Systems, Mar. 26, 2001, pp. 57-64.

Feldman, et al., "SPORC: Group Collaboration using Untrusted Cloud Resources", In Proceedings of the 9th USENIX conference on Operating systems design and implementation, Oct. 4, 2010, 14 pages.

Ignat, et al., "Tree-Based Model Algorithm for Maintaining Consistency in Real-Time Collaborative Editing Systems", In Proceedings of Fourth International Workshop on Collaborative Editing, Nov. 16, 2002, 8 pages.

Ignat, et al., "Customizable Collaborative Editor Relying on treeOPT Algorithm", In Proceedings of the Eighth European Conference on Computer Supported Cooperative Work, Sep. 14, 2003, 5 pages.

Fraser, Neil, "Differential Synchronization", In Proceedings of the 9th ACM symposium on Document engineering, Sep. 16, 2009, pp. 13-20.

"Second Written Opinion Issued in PCT Application No. PCT/US2015/065386", dated Nov. 9, 2016, 27 Pages.

Ressel et al., "Reducing the Problems of Group Undo", In the Proceedings of the International ACM SIGGROUP Conference on Supporting Group Work, Nov. 14, 1999, pp. 131-139.

"Operational Transformation", Retrieved From <<https://en.wikipedia.org/w/index.php?title=Operatianal_transformation&oldid=625428571>>, Sep. 13, 2014, 11 Pages.

PCT International Search Report and Written Opinion Issued in PCT Application No. PCT/US2015/065386, dated Mar. 18, 2016, 14 Pages.

* cited by examiner

Operation Context

Each operation is implicitly associated with a document state to which it applies.

The Inclusion Transform produces a new operation with the same effect, but associated with a different document state.

$$\overset{②}{\beta'} = \overset{①+\alpha}{\beta'} = IT(\overset{①}{\beta}, \overset{①}{\alpha})$$

New context "includes" the effect of α

Contexts must match

FIG. 6

METHOD AND SYSTEM FOR CONCURRENT COLLABORATIVE UNDO OPERATIONS IN COMPUTER APPLICATION SOFTWARE

RELATED APPLICATIONS

This application claims priority from U.S. Provisional Patent Application No. 62/090,372 titled, "METHOD AND SYSTEM FOR CONCURRENT COLLABORATIVE UNDO OPERATIONS IN COMPUTER APPLICATION SOFTWARE" and having a filing date of Dec. 11, 2014, which is incorporated herein by reference.

BACKGROUND

Operational Transformation (OT) allows the creation of real-time collaborative applications that can synchronize changes from multiple users to a shared document or system state. Many computer software applications have functions or features that do not adhere to a set of transformation properties useful for collaborative interaction, and thus cannot support the undo operations as specified in the operational transformation algorithms.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Multi-user real-time collaborative software applications may synchronize data between multiple users or multiple devices. Current aspects describe a method and system for enabling undo operations in collaborative software applications where not all possible actions adhere to the operational transformation properties. Certain aspects herein operate in the absence of the so-called Inverse Property 2.

The details of one or more aspects are set forth in the accompanying drawings and description below. Other features and advantages will be apparent from a reading of the following detailed description and a review of the associated drawings.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout several views.

FIG. 6 illustrates change operation contexts according to aspects of the present disclosure.

DETAILED DESCRIPTION

Figure 1:
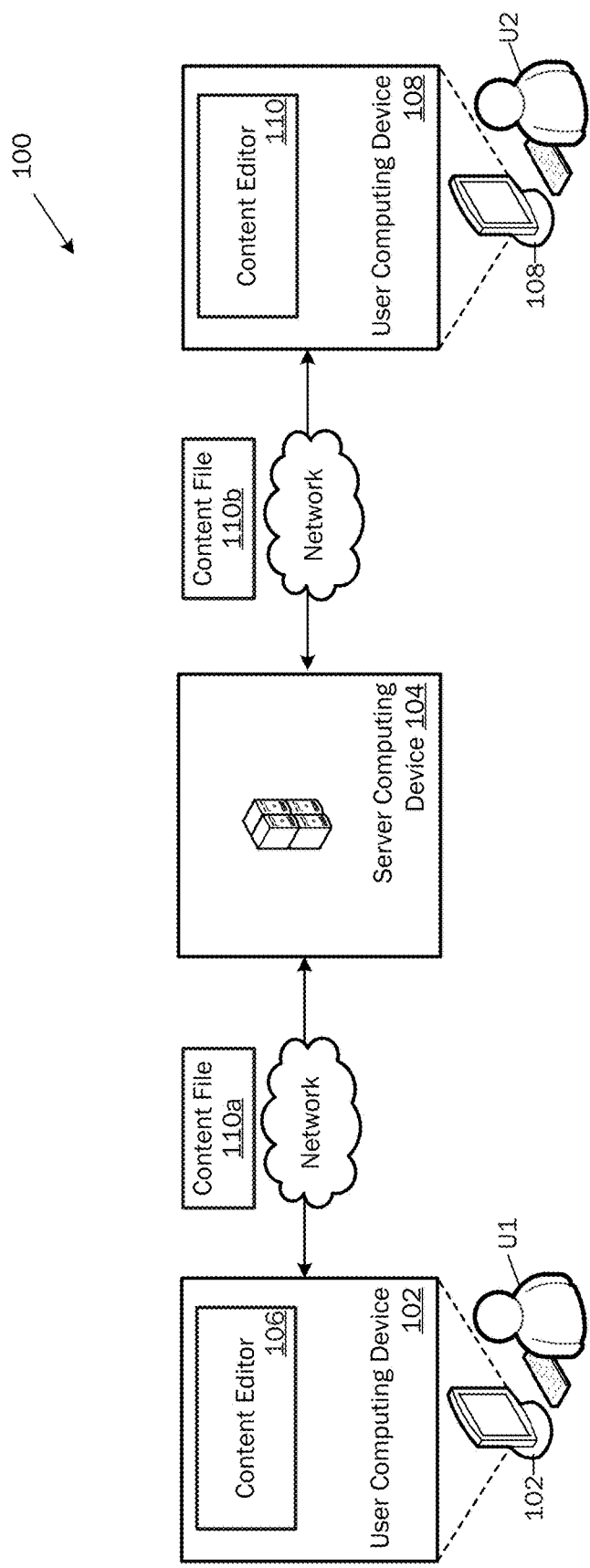
FIG. 1 is a block diagram illustrating a system for collaborative editing.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is non-limiting, and instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are associated with representations of one or more system states. The system states may be made up of a set of actions, called operations, that may be performed to alter a system state. A set of transformations may execute over sets of those operations that adhere to certain properties. Aspects may further describe conveying these operations and metadata from one system to another in a collaborative environment. Aspects may employ a control algorithm for maintaining consistency of the system states and an algorithm for handling undo and redo operations. A memory may be employed to record the history of operations applied to a given system along with an amount of metadata used by the undo algorithm. A state representation may be of a document, web page, circuit diagram, or any other system that may be modified by external actions.

In aspects of the present disclosure, an algorithm may run as part of collaborative document editing software connected through a network to a central server. There, the system state may represent a document (such as a slide-show presentation) and operations may represent user edits to the document. Undo and redo may correspond to the conventional notions in content editing programs. Although the aspects described may be in the context of collaborative content editing programs, it should be recognized that aspects apply generally to operation on documents and systems of other forms and in other domains.

In a collaborative editing environment, the concept of "undo" can be unclear. In some situations, it may be meant to undo the last operation performed on the document. In other situations, the undo may be meant to undo the last operation that was done to a particular portion of the document. In other situations, it may be meant to undo the last operation done by one user other than the user requesting the undo. Aspects of the present disclosure treat undo as undoing the last operation implemented by the user requesting the undo operation. If the last operation performed by a user is the most recent operation to have been done to the document overall, then it is straightforward to think of what to do in response. That operation may be inverted, and that inverse operation may be applied to the document. For example, if the last user operation was to insert the letter T, then the undo operation is not to remove that insert from the document history but rather to have a second operation which is to delete the letter T.

Another problem may arise if other server operations have intervened since the last user (client) operation. There, selection of undo cannot result in just inverting that operation and applying it. A transformation needs to be determined, so that the user can apply it to the current document state as opposed to the document state when the original operation was generated.

Many collaborative editing applications maintain an undo stack which may be a list of performed operations that are invertible or a list of inverse operations to apply. In some aspects, a redo stack may be maintained in a similar way. A server may maintain a history that includes server operations as well as client operations to allow for proper transformation. If multiple server operations exist between two client operations, the server operations may be condensed into a single operation which represents a sequence of operations and the algorithms to perform a transform of the sequence.

In some aspects, redo and undo stack histories may be created by control algorithm transformations as they are read from and applied to the document. Sometimes a transformation may also lead to a no-operation (no-op). For example, a letter may be inserted at position 3 in a slide, but if the slide has been deleted, the transformation will result in a no-op, and if that happens during an undo operation, a choice must be made about what happens. According to one aspect, nothing happens because the operation that would have occurred no longer makes logical sense. In some aspects, a notification may be further provided that alerts the user that the undo operation no longer makes logical sense. In other aspects, undo operations may continue to be performed until an undo operation is found that doesn't transform into a no-op. Such aspects may ensure that some result occur upon user selection of an undo operation. Once an operation is applied, it may be put on an outgoing queue to be sent to the server.

FIG. 1 is a block diagram illustrating a system for collaborative editing according to aspects of the present disclosure. As illustrated in FIG. 1, the system 100 includes a first user computing device 102 that is operable by a first user U1 and a server computing device 104. The user computing device 102 and the server computing device 104 communicate over a network. The user computing device 102 includes a content editor 106. In the example shown in FIG. 1, a content file 110a may be transmitted to the first user computing device 102 from the server computing device 104.

System 100 may further include a second user computing device 108 that is operable by a second user U2 connected to server computing device 104. The second user computing device 108 and the server computing device 104 communicate over a network. The second user computing device 108 includes a content editor 110. In the example shown in FIG. 1, a content file 110b may be transmitted to the second user computing device 102 from the server computing device 104.

It should be understood that first user U1 and second user U2 may both be using content editors to edit separate versions of the same document. In this case, first user U1 is editing document version 110a while second user U2 is editing document version 110b. Document versions 110a and 110b are versions of the same document. The users are editing the document in a collaborative environment where changes made by both users should be updated to a master version of the document.

System 100 represents a common topology for collaborative interaction with a shared state for users to interact with client software, such as content editors, with changes to the state propagated via a central server, such as server 104 to other users (could be any number of additional users) with other client software, but many other approaches, for example, peer-to-peer interaction, are possible. In some aspects, the content editor, such as content editors 106 and 110 are applications running on the user computing devices that are operable to collaboratively edit content files. Additionally, in some aspects, the content editors interact with the server computing device 104. In some examples, the content editors may be browser applications operable to generate collaborative edits based on content served by a remote computing device such as the server computing device 104 or another computing device. According to an example, an extension is installed on the user computing device as a plug-in or add-on to the browser application (i.e., content editor 106) or is embedded in the browser application.

In an example, the content editor is a collaborative document editor such as the WORD document editor from Microsoft Corporation of Redmond, Wash. or a spreadsheet editor such as the EXCEL® spreadsheet editor also from Microsoft Corporation. Similar non-limiting example content editors may include the POWERPOINT® presentation graphics program from Microsoft Corporation of Redmond, Wash.

Figure 2:
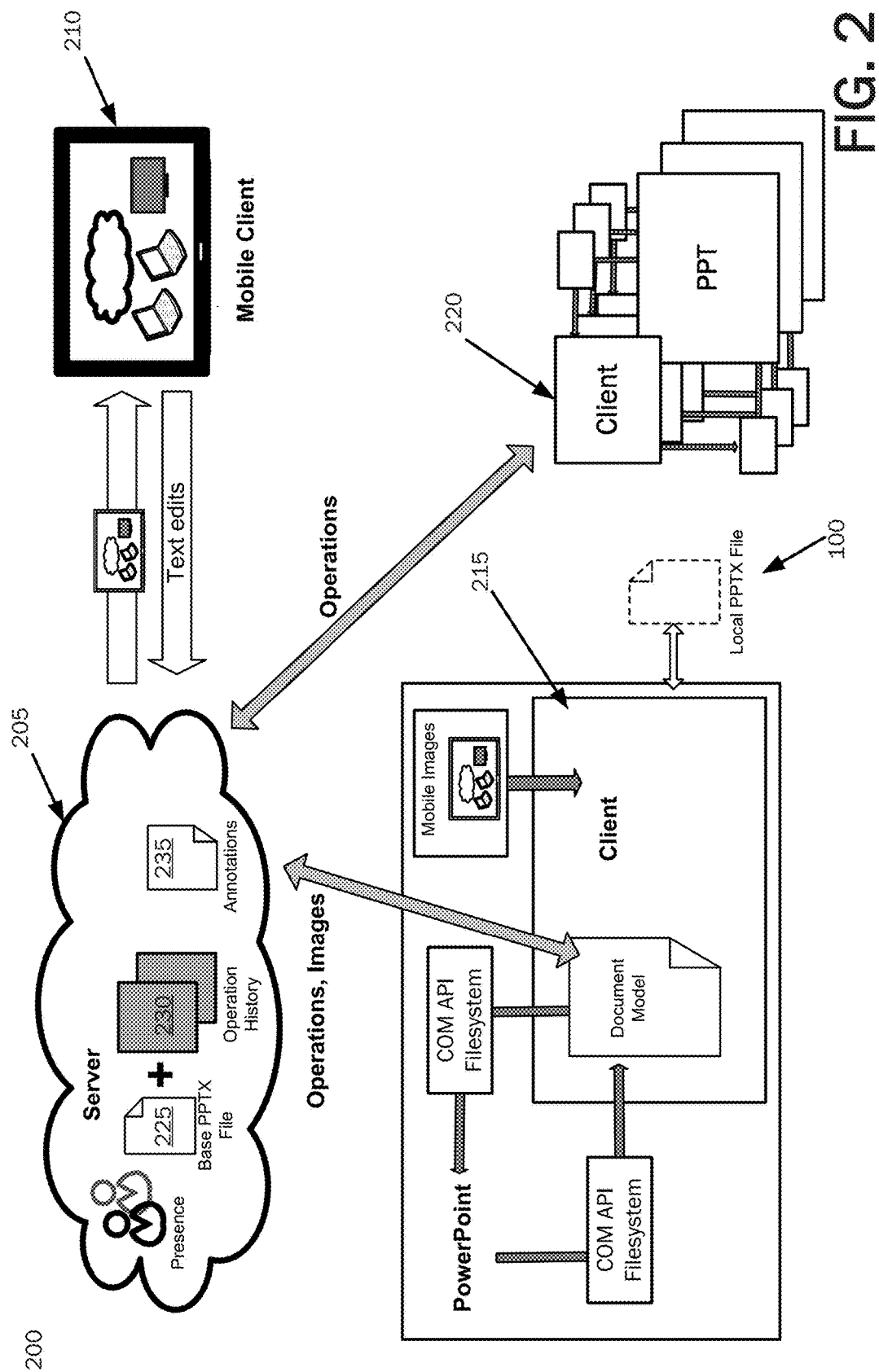
FIG. 2 is a block diagram illustrating an operating environment for collaborative editing.

FIG. 2 is a detailed block diagram of one example of a system 200 for propagating changes from one document to another. System 200 may contain a server 205 in communication with a number of clients, such as mobile client 210, first client 215, and second client 220. The server 205 may maintain a base document, such as an example base PowerPoint file 225. The base PowerPoint file 225 may be a file which each of mobile client 210, first client 215, and second client 220 are collaborating on and providing edits to the server 205. The server 205 maintains an operation history 230. Operation history 230 may comprise a record of each operational change sent for base PowerPoint file 225 and server 205. Server 205 may also maintain a list of annotations 235 for base PowerPoint file 225. In an example operation, in the system 200, mobile client 210 may provide text edits to the base PowerPoint file 225. Client 220 may provide opaque operation changes to the base PowerPoint file 225. Client 215 may provide changes to the base PowerPoint file 225 including both opaque operations and image changes.

The user computing device 102, the server computing device 104, the server 205, the mobile client 210, the first client 215, and the second client 220 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which aspects are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 3:
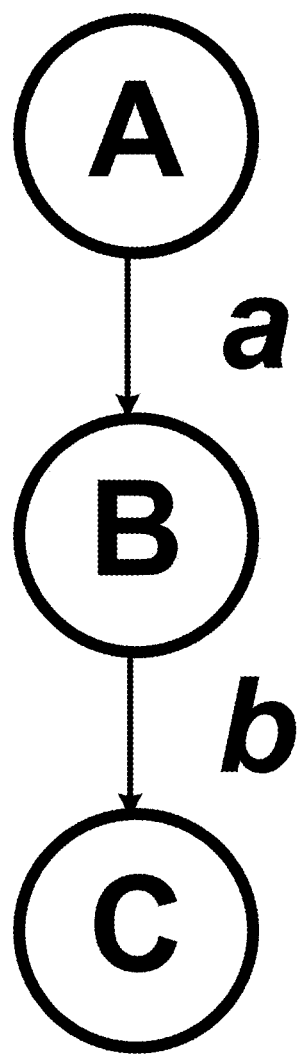
FIG. 3 illustrates aspects of applying multiple operations.

The following descriptions help to describe aspects of operations, states, contexts, and other aspects of operational transformations relevant to aspects of the present disclosure. An operation may be any function that transforms a document from one state to another, e.g., "turn a shape from blue to red" or "insert text 'cat' at a specific location." A single operation can also be a composite of multiple operations, e.g., "turn a shape from blue to red and insert text 'cat' at a specific location." In FIGS. 3 and 4, capital letters may be used to indicate a given document state and lower case letters may be used to indicate operations and '+' may be used to indicate the application of an operation. Turning to FIG. 3, it is illustrated that A+a+b=C and means that applying operation "a" followed by operation "b" on state "A" results in state "C".

A given operation may only be valid when applied to a specific state, known as the operation's context, e.g., changing a shape from blue to red only makes sense in a state where that shape is blue. In the above example, the context of "a" is "A" and the context of "b" is "B". In aspects of the present disclosure, multiple users may be allowed to perform operations on the same document and use operational transformations to assure that the state of the document is consistent across users. Two operations that share the same context may be transformed past each other. For example, if operation "a" is to "turn a shape from blue to red" and operation "b" is to "delete the blue shape," transforming "b" past "a", written as $\tau(b,a)$ or b', results in "delete the red shape" and transforming a past b, written as $\tau(a,b)$ or a', results in an empty operation or no-op as the shape no longer exists.

Figure 4:
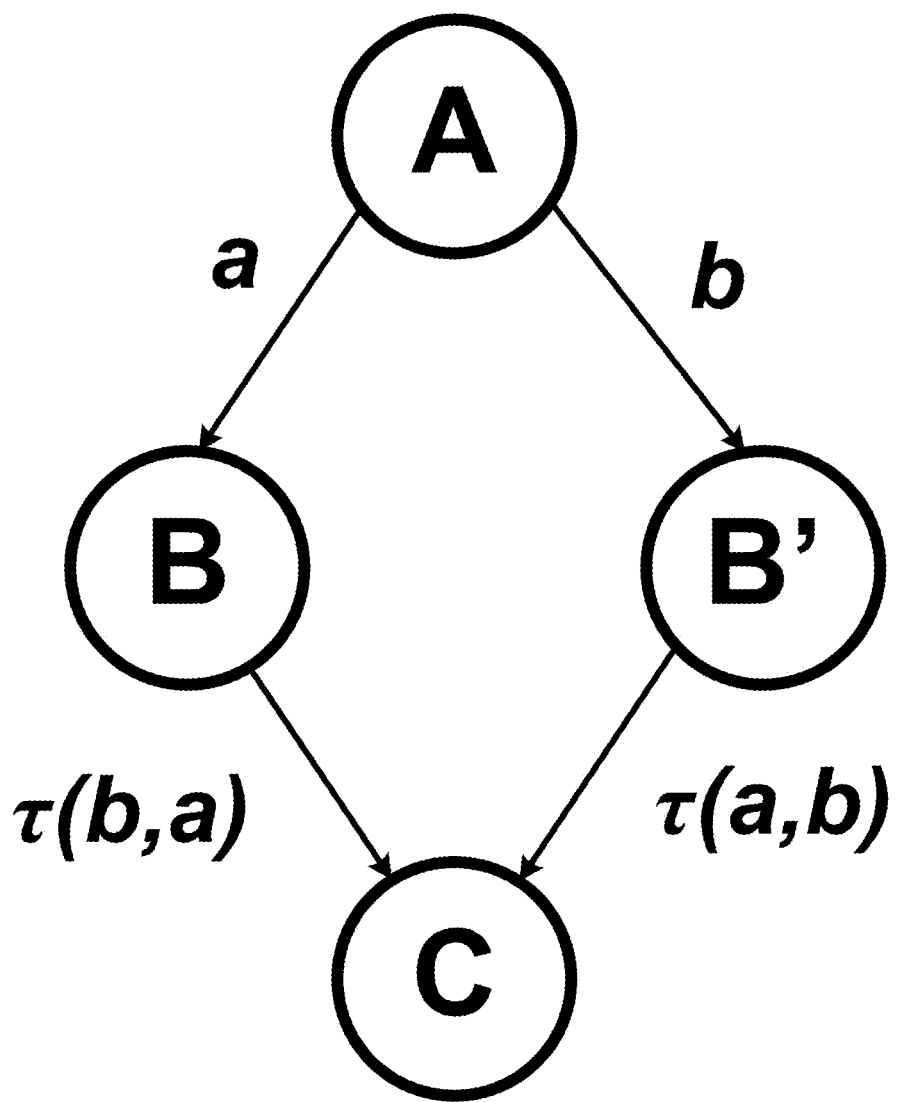
FIG. 4 illustrates application of the convergence property during transformations.

This type of transformation is known as an inclusion transformation (IT). It produces a new version of operation "a" whose context includes the effect of "b". As illustrated in FIG. 4, the transformations assure that $A+a+\tau(b,a) \equiv A+b+\tau(a,b)$ wherein $\equiv$ implies an equivalent document state. This is known as the convergence property.

Figure 5:
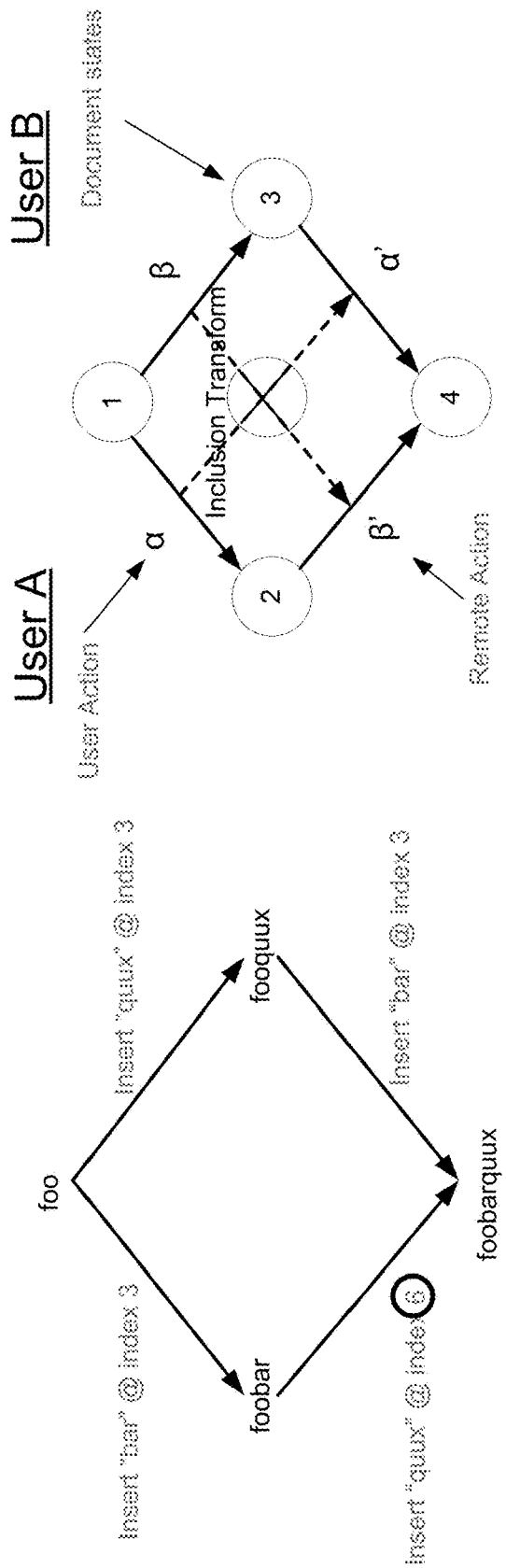
FIG. 5 illustrates an implementation of operational transformation according to aspects of the present disclosure.

FIG. 5 illustrates an implementation of operational transformation (OT) according to aspects of the present disclosure. A base document (version 1) may contain the text phrase "foo". User A and user B may both be collaborating on editing this base document. User A may attempt to insert the text "bar" at index position 3 of the base document. Similarly, user B may attempt to insert the text "quux" at index position 3. The edit by user A may result in a document version 2 containing the text "foobar". The edit by user B may result in a document version 3 containing the text "fooquux". The OT system thus needs to employ an inclusion transform to the operation to create a document version 4 which properly contains both textual edits. The document version 4 should contain a final text result of "foobarquux". In some aspects, the results may also be "fooquuxbar", "foo", or simply and empty string. Each of these results may still satisfy the consistency property. A drafter of the transformation may determine which result is desired.

The inclusion transform (IT) applied states that $\alpha'=IT(\alpha, \beta)$. This is the inclusion transform of the first user action $\alpha$ with second user action $\beta$. In other words, $\alpha'$ is an operation that will have the same effect as $\alpha$ on a document where $\beta$ has already been applied. This follows the consistency property which states: if $\alpha'=IT(\alpha,\beta)$ and $\beta'=IT(\beta,\alpha)$ then $\alpha+\beta=\beta+\alpha'$).

FIG. 6 illustrates change operation contexts according to aspects of the present disclosure. Each change operation may be implicitly associated with a document state to which it applies. The IT may produce a new operation with the same effect, but the new operation may be associated with a different document state. In other words, $\beta'^2=\beta'^{1+\alpha}=IT(\beta^1, \alpha^1)$ such that the new context includes the effect of $\alpha$ and such that the contexts of the user actions in the IT are the same. Where the superscripts here explicitly indicate the context (the document state to which the operation applies). Document context is omitted from other equations for ease of notation and can be inferred.

The inverse of an operation, "a", with context A, is defined as the operation $\bar{a}$ with context A+a such that $A+a+\bar{a}=A$. This is known as inverse property 1 (IP1). For example, the inverse of "turn a shape from blue to red" is "turn a shape from red to blue." Aspects of the present disclosure may require that the following inverse property also holds for all operations: $\tau(\tau(a,b), \bar{b})=a$, known to those skilled in the art as inverse property 2 (IP2). Here, the symbol $\equiv$ implies equivalent effect of operations. The transformation example of changing a color of a deleted shape resulting in an empty operation demonstrates a case where IP2 fails to hold. Aspects of the present disclosure do require that inverse property 3 (IP3) holds true such that $\overline{\tau(a,b)}=\tau(\bar{a}, \tau(b,a))$.

Using the above definitions, it may be explained how present aspects implement undo across multiple users in the case where inverse property 2 (IP2) does not hold true. Undoing an operation, "a", may be defined as applying an operation which puts the document into the state it would reasonably be in if "a" had never been applied. First, a user may only undo operations they performed, or user operations, which are indicated with a subscript such as Second, the multi-user case may be reduced to a two user case by treating all non-self-operations as coming from a single user, referred to as server operations, which are indicated with the subscript "s", such as $a_s$. As operations may be concatenated into composite operations, server operations may be concatenated as much as possible such that any two consecutive user operations are separated by exactly one server operation (which may or may not be an empty operation).

When a user triggers an undo, an undo operation may be generated to apply and send to all other users, which is the undo of the most recent user operation that is neither an undo operation nor a do operation that has already been undone. When transmitting the undo operation, it may not be indicated that it is an undo operation, and therefore, undo server operations do not have to be distinguished from regular server operations in the history of operations. However, it may be tracked whether user operations are undo operations or not undo operations, sometimes referred to as "do" operations. Every undo operation may have a corresponding do operation in the history that it undid. Using operational transformations, and knowing IP1 and IP3, it may be assumed that undo operations will be implemented correctly and the state will remain consistent across all users.

Figure 7:
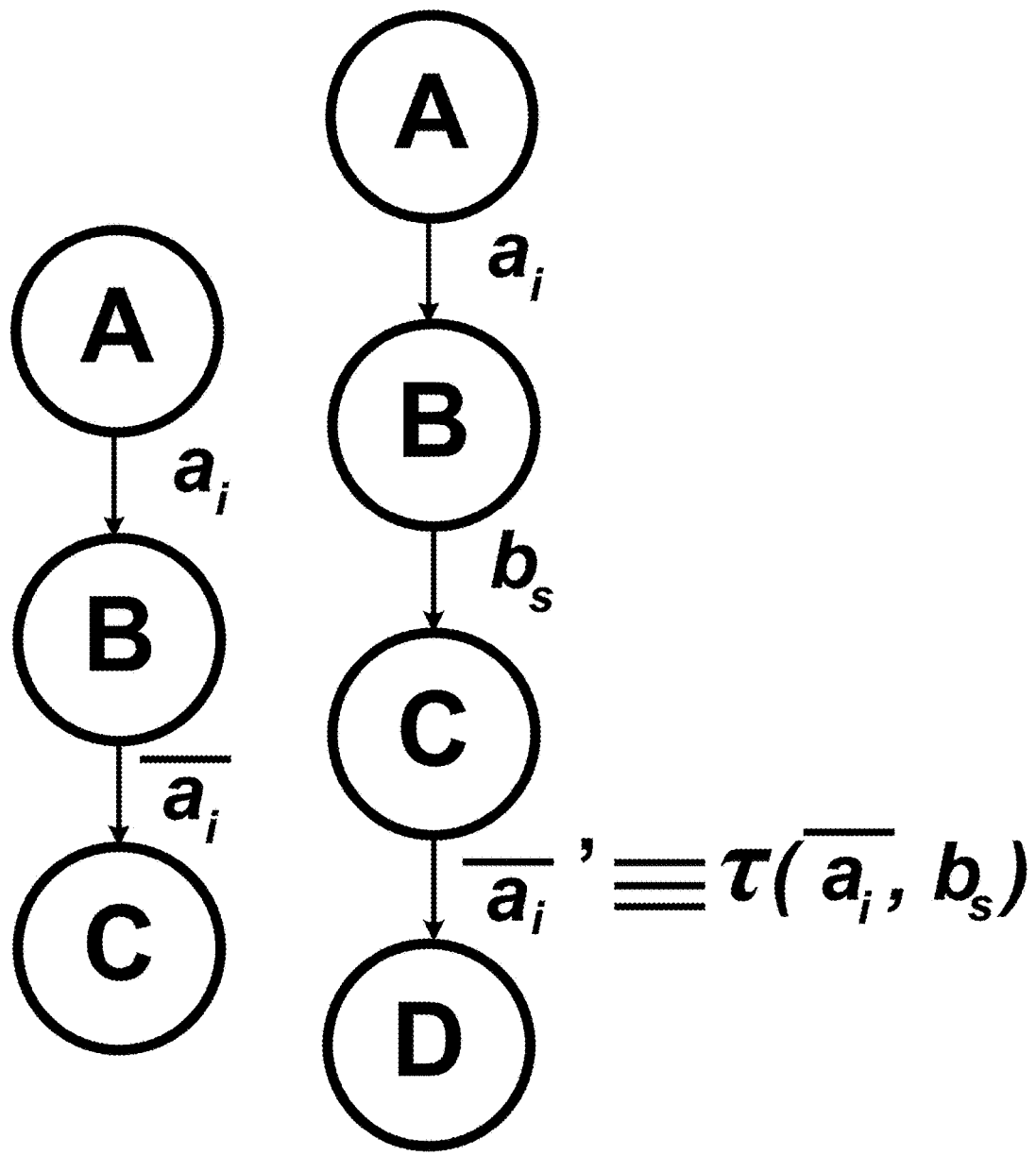
FIG. 7 illustrates a first undo case according to aspects of the present disclosure.

The left side of FIG. 7 illustrates an undo case where the most recent user operation is a do operation, $a_i$, with no intervening server operation. Here the inverse operation, $\overline{a_i}$, may simply be applied. Note that this returns to the original state via IP1. Alternatively, the right side of FIG. 7, where the most recent user operation is a do operation, $a_i$, and there is an intervening operation, $b_s$, (while shown here as a single server operation, it may be any intervening composite operation consisting only of server operations) the transform of the inverse operation past the server operation, $\tau(\overline{a_i}, b_s)$ may be applied. Because of the intervening server operation, this may create a new state. Using IP3, this can be proved to be equivalent to applying $b_s$ to state A. In other words, D is equivalent to applying the effect of $b_s$ to state A.

In a more general case, user operations may be separated by server operations. Furthermore, multiple user operations may need to be performed. Operations can only be undone once (although redo operations may be a separate operation), thus, to process an undo, aspects must find the most recent operation that has not already been undone, and transform its inverse past any intervening operations. The intervening operations may be server operations or do-undo pairs. In other words, they may be operations that have already been undone and their corresponding undo operations. As aspects may always choose the most recent operation that has not been undone as the operation to undo next. Do-undo operations pairs are always neatly nested, like parentheses, i.e. a→b→$\overline{a}$→$\overline{b}$ is not a valid operation history as "a" would not have an undo operation before undoing the more recent operation "b". Therefore, between any do-undo operation pair only server operations or well-ordered do-undo operation pairs may exist. There may always be an innermost do-undo operation pair, separated by only a single (possibly composite, possibly empty) server operation.

Figure 8:
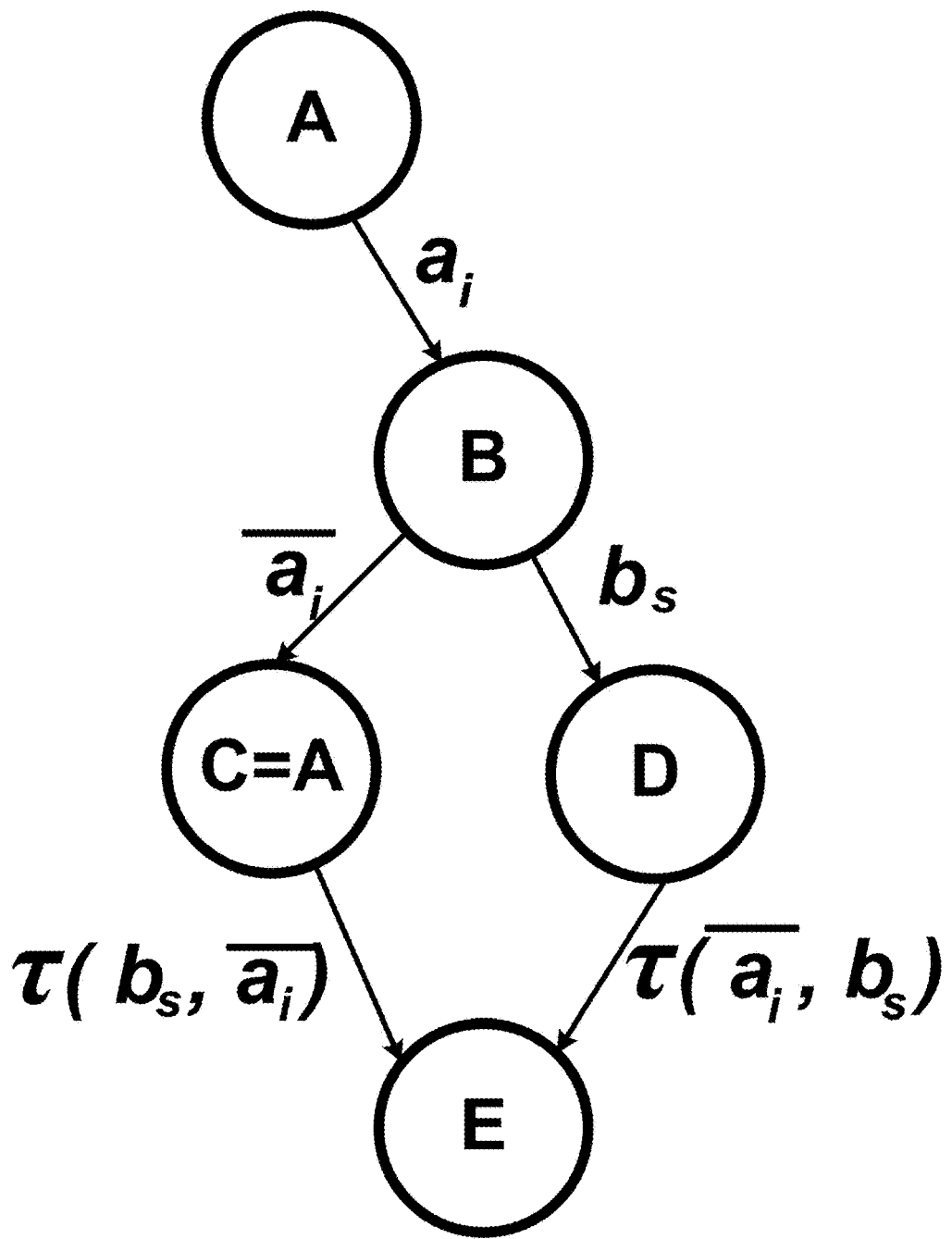
FIG. 8 illustrates the derivation of an undo operation according to aspects of the present disclosure.
Figure 9:
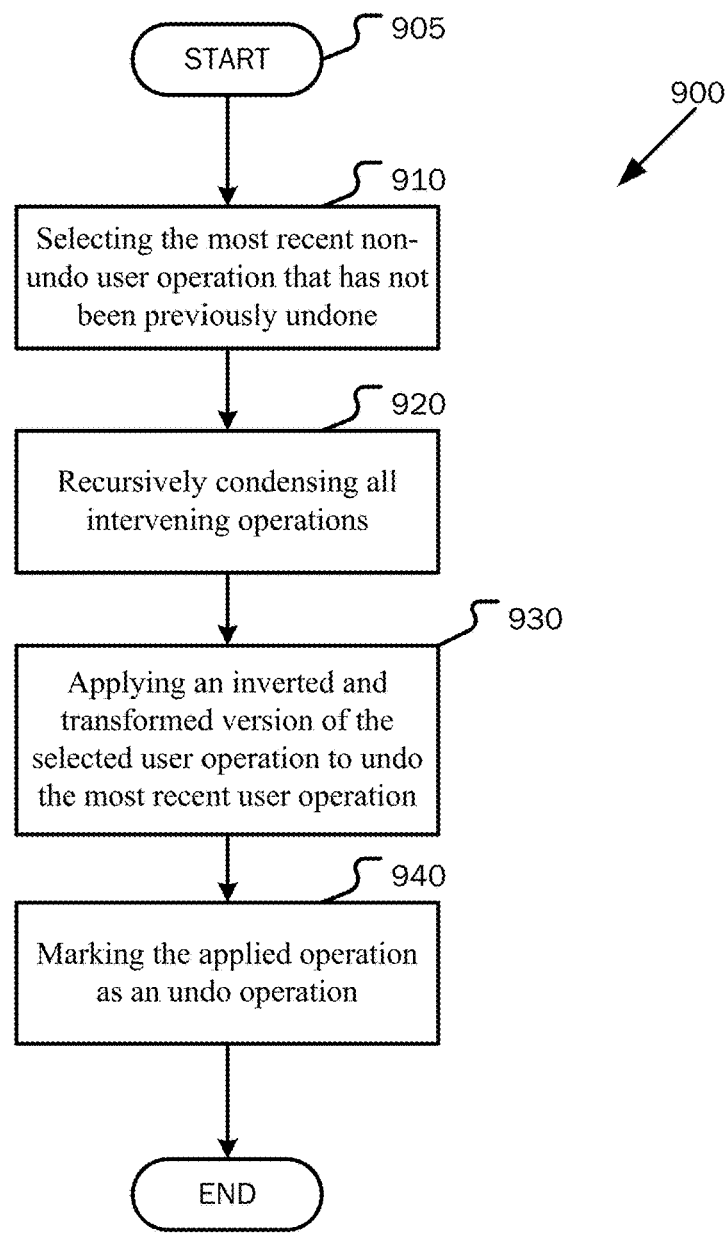
FIG. 9 is a flowchart showing general stages involved in an example method for performing an undo operation according to aspects of the present disclosure.

Because IP2 does not necessarily hold true, transforming past do-undo operation pairs may prove challenging. FIG. 8 illustrates transforming server operations out from between do-undo pairs so they may be safely concatenated with surrounding server operations into a composite operation. In a case where there are no intervening server operations between do-undo operation pairs, the operation pair may be treated as a no-op. However, if there is an intervening operation, $b_s$ between a do-undo operation pair, $a_i$ and $\tau(\overline{a_i}, b_s)$, the set of three operations may be reduced to a single operation equivalent to $\tau(\overline{a_i}, b_s)$, which is equivalent to a single server operation that can be concatenated into a composite operation with any other adjacent server operation.

Having described an example architecture and other aspects of the present disclosure above with reference to FIGS. 1-8, FIG. 9 is a flowchart showing general stages involved in an example method 900 for processing successive undo requests. Method 900 may start at step 905. Next, at step 910, the most recent user operation $a_i^1$ that has not been previously undone, and is not itself an undo operation may be selected. At step 920, all intervening server operations between do-undo operation pairs may be condensed recursively, starting with the innermost server operation. The pairs may be condensed into a single operation using the equivalence $a_i + b_s + \tau(\overline{a_i}, b_s) \equiv \tau(b_s, \overline{a_i})$ and by concatenating consecutive server-operations into single composite operations. Here the symbol ≡ implies equivalent effect and the symbol + implies concatenation. The result of operation 920 may then be a single server operation, $b_s^*$.

Next, at step 930, the operation $\tau(\overline{a_i^1}, b_s^*)$ may be applied as the corresponding undo operation to $a_i^1$. This corresponding undo operation may then be sent to all other users in the collaborative environment to be applied. Finally, at step 940, the operation may be marked in the operation history as an undo operation. The marking may further indicate what operation was undone to create a do-undo operation pair. The notions of user/server and undo/redo may be relative to a given user, so if the undo/redo history is stored on the server, then it also needs to keep track of which user is associated with which operation. If the undo/redo history is kept on the client, then it may be clear who the user is.

Figure 10:
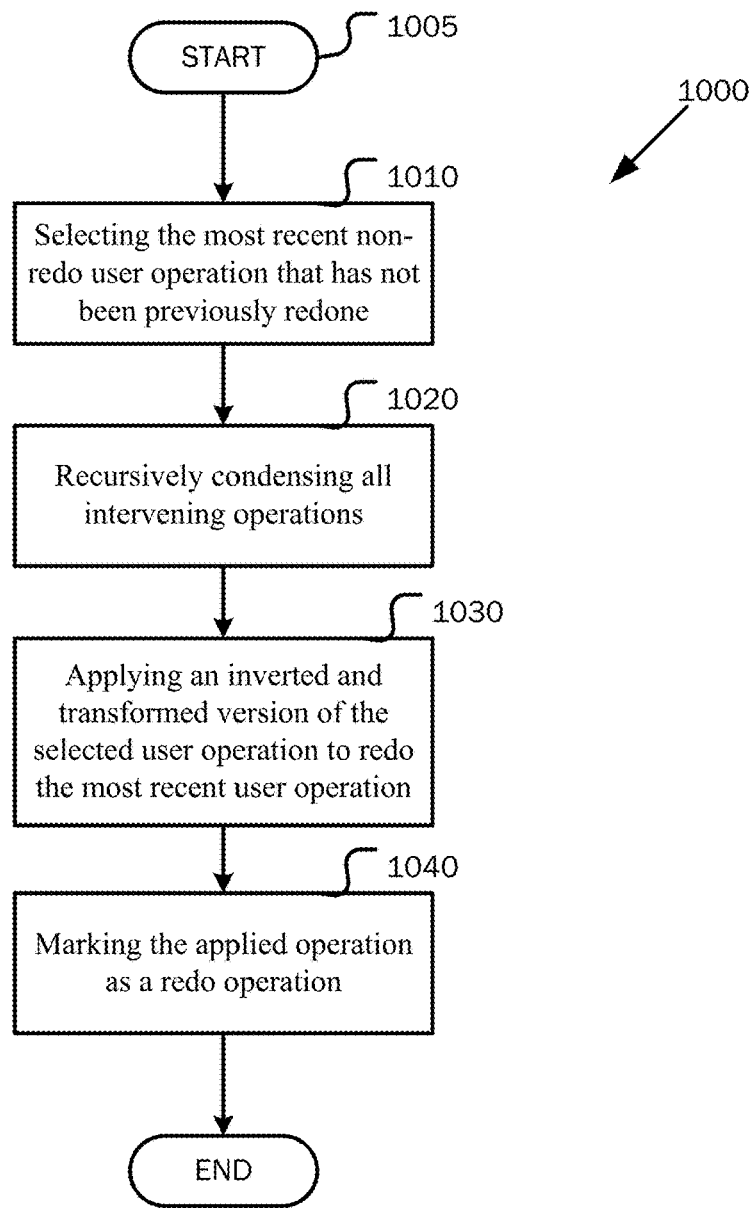
FIG. 10 is a flowchart showing general stages involved in an example method for performing a redo operation according to aspects of the present disclosure.

FIG. 10 is a flowchart showing general stages involved in an example method 1000 for processing redo requests where IP2 does not necessarily hold true. While such a method may be similar to a method for generating undo operation, a redo may be considered as the undo of an undo operation. In such aspects, the redo algorithm may track undo-redo operation pairs instead of tracking do-undo operation pairs.

Method 1000 may start at step 1005 and proceed to step 1010. At step 1010, the most recent undo operation $a_i^1$ may be selected that has not previously been redone. Next, at step 1020, all intervening server operations between undo-redo operation pairs may be condensed recursively, starting with the innermost server operation. The condensation may result in a single operation using the equivalence $a_i + b_s + \tau(a_i^r, b_s) \equiv \tau(b_s, a_i^r)$ and by concatenating adjacent server operations into single composite operations. The result of step 1020 may be a single server operation, $b_s^*$.

Next, at step 1030, the operation $\tau(\overline{a_i^1}, b_s^*)$ may be applied as the corresponding redo operation to $a_i^1$. This corresponding redo operation may then be sent to all other users in the collaborative environment to be applied. Finally, at step 1040, the operation may be marked in the operation history as a redo operation. The marking may further indicate what operation was undone to create an undo-redo operation pair.

FIGS. 11-12A and 12B and the associated descriptions provide a discussion of a variety of operating environments in which examples of the present disclosure are practiced. However, the devices and systems illustrated and discussed with respect to FIGS. 11-12A and 12B are for purposes of example and illustration and are not limiting of a vast number of computing device configurations that are used for practicing aspects, described herein.

Figure 11:
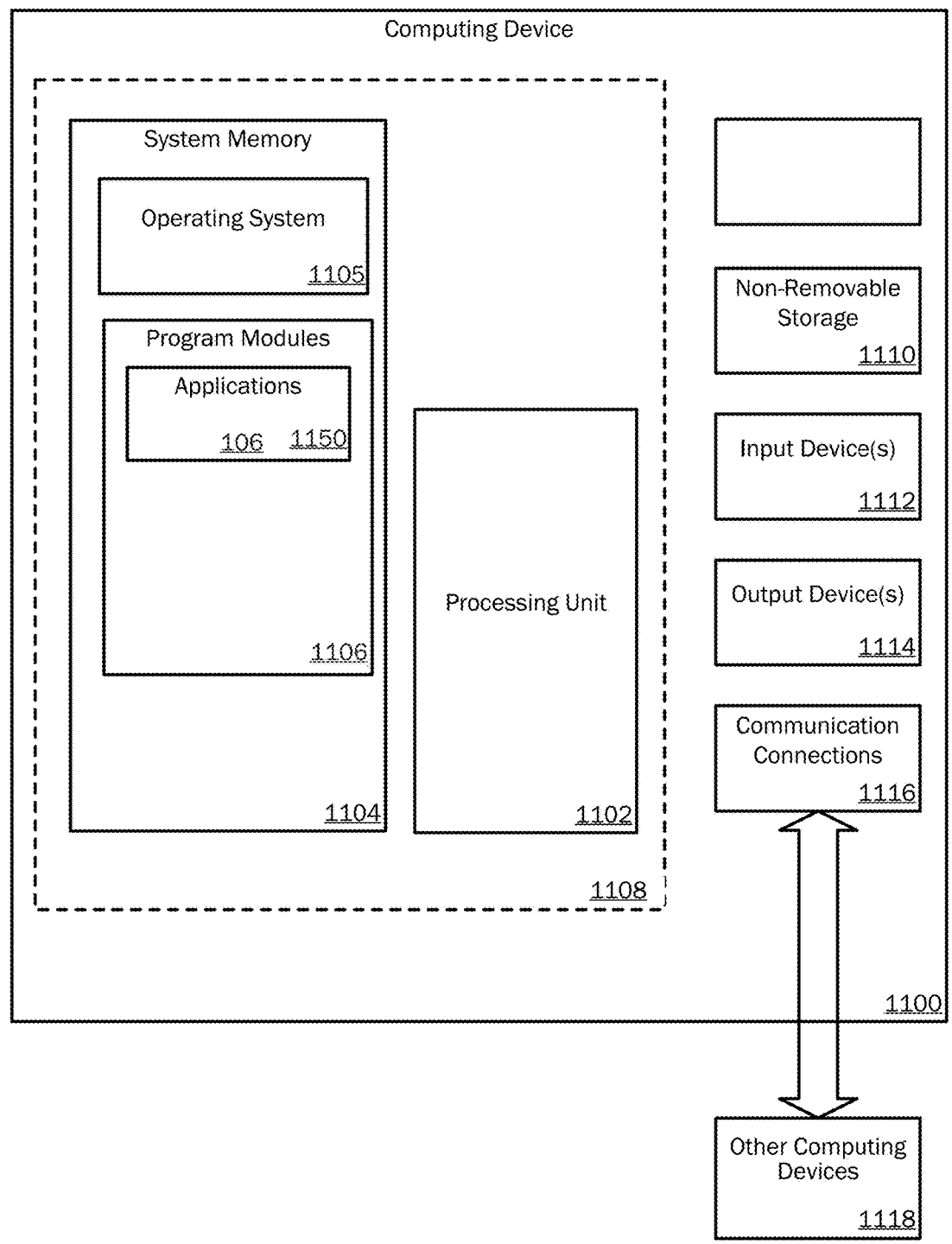
FIG. 11 is a block diagram illustrating one example of the physical components of a computing device.

FIG. 11 is a block diagram illustrating physical components (i.e., hardware) of a computing device 1100 with which examples of the present disclosure can be practiced. In a basic configuration, the computing device 1100 includes at least one processing unit 1102 and a system memory 1104. According to an aspect, depending on the configuration and type of computing device, the system memory 1104 comprises, but is not limited to, volatile storage (e.g., random access memory), non-volatile storage (e.g., read-only memory), flash memory, or any combination of such memories. According to an aspect, the system memory 1104 includes an operating system 1105 and one or more program modules 1106 suitable for running software applications 1150 including the content editor 106. According to an aspect, the system memory 1104 includes the software for incorporating undo and redo operations. The operating system 1105, for example, is suitable for controlling the operation of the computing device 1100. Furthermore, aspects are practiced in conjunction with a graphics library, other operating systems, or any other application program, and are not limited to any particular application or system. This basic configuration is illustrated in FIG. 11 by those components within a dashed line 1108. According to an aspect, the computing device 1100 has additional features or functionality. For example, according to an aspect, the computing device 1100 includes additional data storage devices (removable and/or non-removable) such as, for example, magnetic disks, optical disks, or tape. Such additional storage is illustrated in FIG. 11 by a removable storage device 1109 and a non-removable storage device 1110.

As stated above, according to an aspect, a number of program modules and data files are stored in the system memory 1104. While executing on the processing unit 1102, the program modules 1106, applications 1150, and content editor 106 (e.g., software for incorporating undo and redo operations) performs processes including, but not limited to, one or more of the stages of the methods 900 and 1000 illustrated in FIGS. 9 and 10. According to an aspect, other program modules may be used in accordance with examples of the present disclosure and include applications such as electronic mail and contacts applications, word processing applications, spreadsheet applications, database applications, slide presentation applications, drawing or computer-aided application programs, etc.

Aspects of the present disclosure are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 11 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 1100 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 1100 has one or more input device(s) 1112 such as a keyboard, a mouse, a pen, a sound input device, a touch input device, etc. The output device(s) 1114 such as a display, speakers, a printer, etc. are also included according to an aspect. The aforementioned devices are examples and others may be used. According to an aspect, the computing device 1100 includes one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein includes computer storage media. Computer storage media include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. According to an aspect, any such computer storage media is part of the computing device 1100. Computer storage media do not include a carrier wave or other propagated data signal.

According to an aspect, communication media is embodied by computer readable instructions, data structures, program modules, or other data in a modulated data signal, such as a carrier wave or other transport mechanism, and includes any information delivery media or transmission media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

Figure 12A:
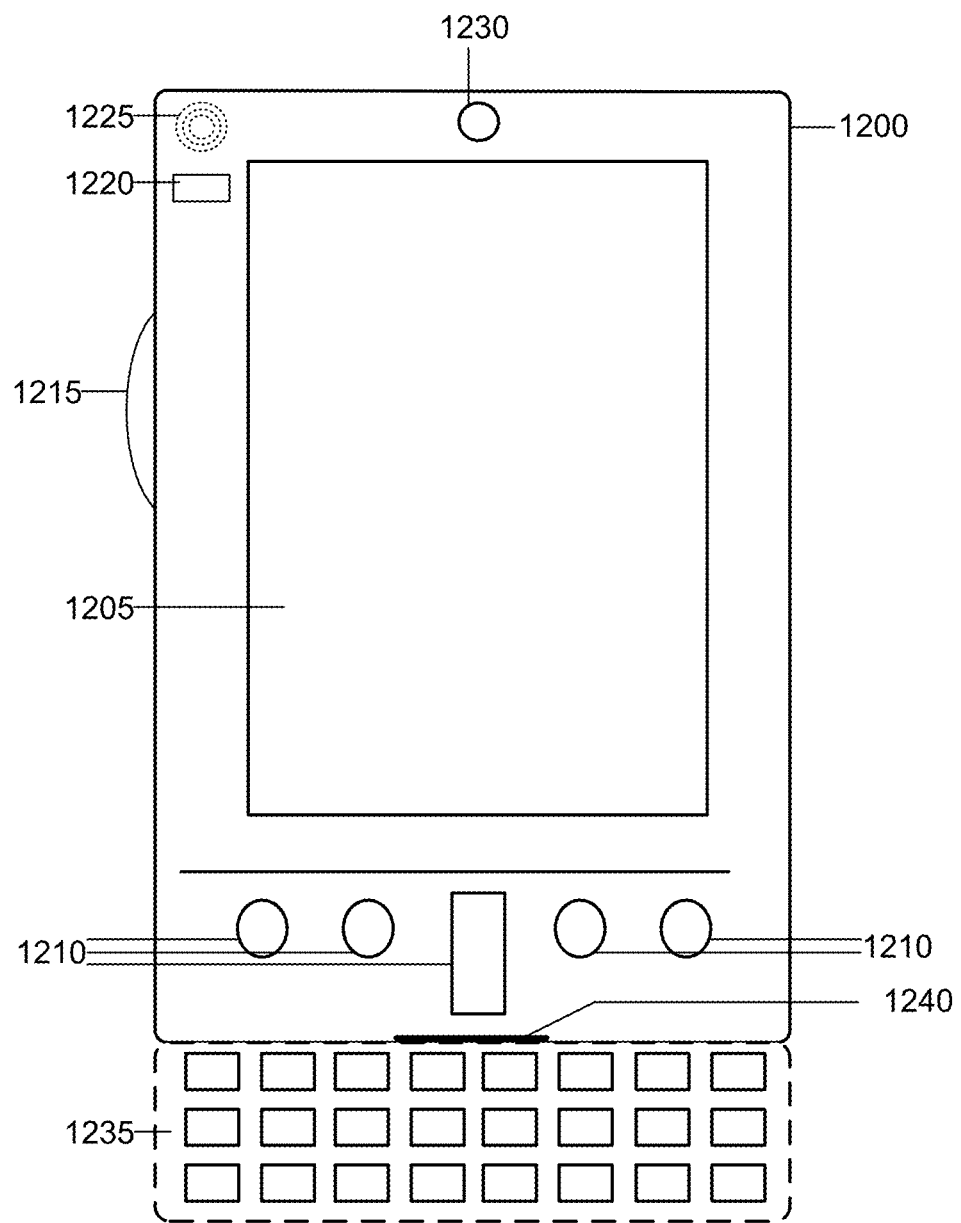
FIGS. 12A and 12B are simplified block diagrams of a mobile computing device.
Figure 12B:
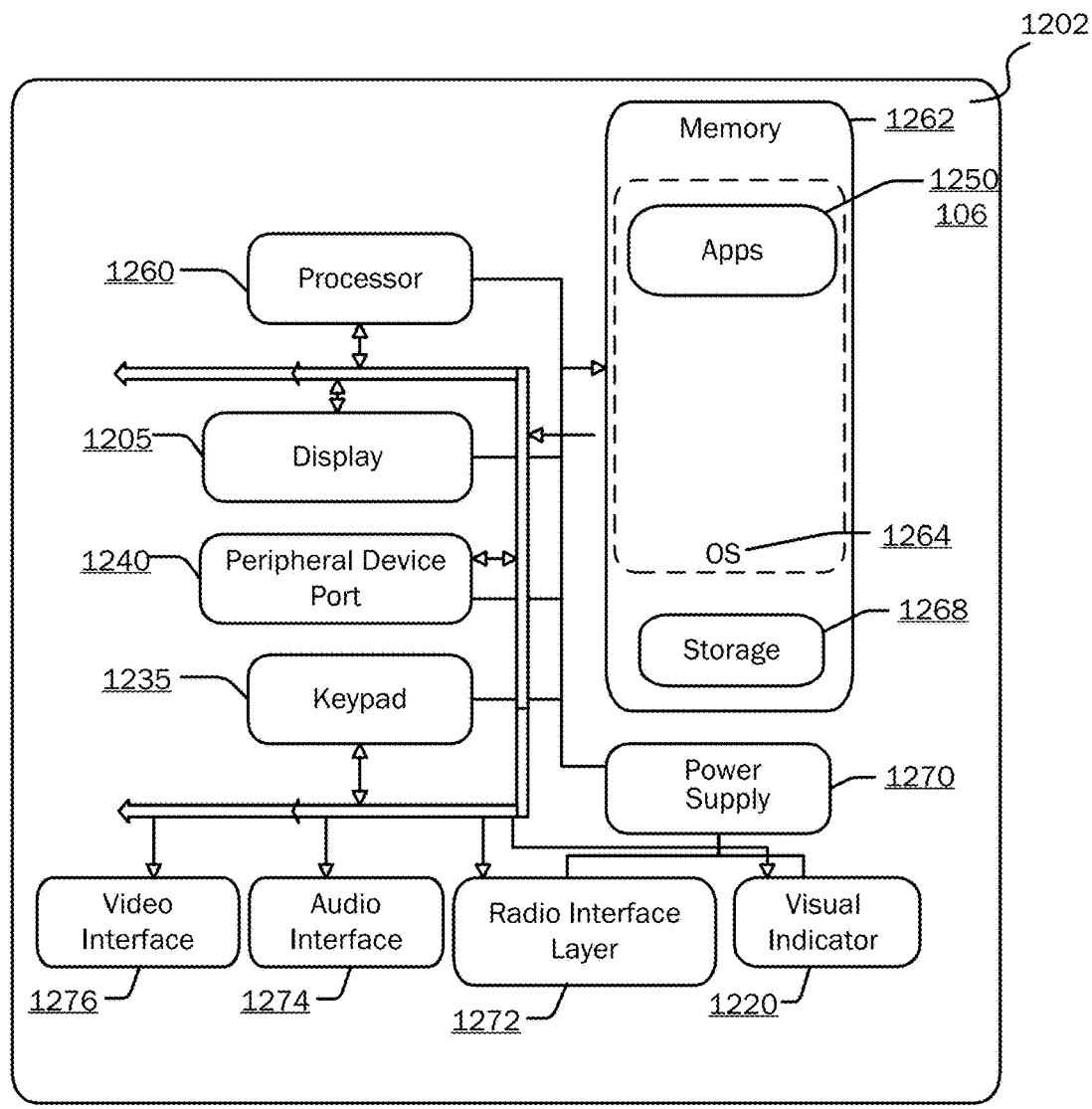

FIGS. 12A and 12B illustrate a mobile computing device 1200, for example, a mobile telephone, a smart phone, a tablet personal computer, a laptop computer, and the like, with which aspects may be practiced. With reference to FIG. 12A, an example of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. According to an aspect, the display 1205 of the mobile computing device 1200 functions as an input device (e.g., a touch screen display). If included, an optional side input element 1215 allows further user input. According to an aspect, the side input element 1215 is a rotary switch, a button, or any other type of manual input element. In alternative examples, mobile computing device 1200 incorporates more or less input elements. For example, the display 1205 may not be a touch screen in some examples. In alternative examples, the mobile computing device 1200 is a portable phone system, such as a cellular phone. According to an aspect, the mobile computing device 1200 includes an optional keypad 1235. According to an aspect, the optional keypad 1235 is a physical keypad. According to another aspect, the optional keypad 1235 is a "soft" keypad generated on the touch screen display. In various aspects, the output elements include the display 1205 for showing a graphical user interface (GUI), a visual indicator 1220 (e.g., a light emitting diode), and/or an audio transducer 1225 (e.g., a speaker). In some examples, the mobile computing device 1200 incorporates a vibration transducer for providing the user with tactile feedback. In yet another example, the mobile computing device 1200 incorporates peripheral device port 1240, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one example of a mobile computing device. That is, the mobile computing device 1200 incorporates a system (i.e., an architecture) 1202 to implement some examples. In one example, the system 1202 is implemented as a "smart phone" capable of running one or more applications (e.g., browser, e-mail, calendaring, contact managers, messaging clients, games, and media clients/players). In some examples, the system 1202 is integrated as a computing device, such as an integrated personal digital assistant (PDA) and wireless phone.

According to an aspect, one or more application programs 1250 are loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, the content editor 106, and so forth. According to an aspect, software for incorporating undo and redo operations is loaded into memory 1262. The system 1202 also includes a non-volatile storage area 1268 within the memory 1262. The non-volatile storage area 1268 is used to store persistent information that should not be lost if the system 1202 is powered down. The application programs 1250 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200.

According to an aspect, the system 1202 has a power supply 1270, which is implemented as one or more batteries. According to an aspect, the power supply 1270 further includes an external power source, such as an AC adapter or a powered docking cradle that supplements or recharges the batteries.

According to an aspect, the system 1202 includes a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1250 via the operating system 1264, and vice versa.

According to an aspect, the visual indicator 1220 is used to provide visual notifications and/or an audio interface 1274 is used for producing audible notifications via the audio transducer 1225. In the illustrated example, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. According to an aspect, the system 1202 further includes a video interface 1276 that enables an operation of an on-board camera 1230 to record still images, video stream, and the like.

According to an aspect, a mobile computing device 1200 implementing the system 1202 has additional features or functionality. For example, the mobile computing device 1200 includes additional data storage devices (removable and/or non-removable) such as, magnetic disks, optical disks, or tape. Such additional storage is illustrated in FIG. 12B by the non-volatile storage area 1268.

According to an aspect, data/information generated or captured by the mobile computing device 1200 and stored via the system 1202 is stored locally on the mobile computing device 1200, as described above. According to another aspect, the data is stored on any number of storage media that is accessible by the device via the radio 1272 or via a wired connection between the mobile computing device 1200 and a separate computing device associated with the mobile computing device 1200, for example, a server computer in a distributed computing network, such as the Internet. As should be appreciated such data/information is accessible via the mobile computing device 1200 via the radio 1272 or via a distributed computing network. Similarly, according to an aspect, such data/information is readily transferred between computing devices for storage and use according to well-known data/information transfer and storage means, including electronic mail and collaborative data/information sharing systems.

Aspects of the present disclosure, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the present disclosure as claimed in any way. The aspects, examples, and details provided in this application are considered sufficient to convey possession and enable others to make and use the best mode claimed. The present disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method for implementing an undo operation in a collaborative editing environment comprising the steps of:
   receiving an undo request from a first user to perform an undo operation of a most recently performed do operation entered by the first user on a first user document version of a base document, wherein the base document is concurrently being edited by a non-first user via a non-first user version of the base document in a collaborative editing environment;
recursively condensing all non-first user operations occurring to the base document through the collaborative editing environment that are intermediate the most recently performed do operation and the undo request in a sequentially ordered stack of operations relative to the base document to create a condensed server operation; and
applying, at the first user document version of the base document, an inverted version of the most recently performed user do operation to undo the most recently performed user do operation prior to executing the condensed server operation.

2. The method of claim 1, further comprising marking the inverted version of the most recently performed user operation as an undo operation in a document operation history prior to executing the condensed server operation.

3. The method of claim 1, wherein the collaborative editing environment is an operational transformation system.

4. The method of claim 1, further comprising determining whether the inverted version of the most recently performed user operation may be applied to a current document state of the first user document version of the base document.

5. The method of claim 1, wherein the non-first user operations occurring between the most recently performed operation and the undo request comprise pairs of non-first user do-undo operations.

6. The method of claim 1, wherein the condensed server operation comprises a single server operation.

7. The method of claim 1, further comprising, after applying the inverted version of the most recently performed user operation at the first user document version of the base document, sending the inverted version of the most recently performed user operation for implementation in the non-first user document version of the base document.

8. The method of claim 1, wherein the first user document version of the base document is in the same state during the most recently performed user do operation and during application of the inverted version of the most recently performed user do operation.

9. A method for implementing a redo operation in a collaborative editing environment comprising the steps of:
receiving a redo request from a first user to perform a redo operation of a most recently performed undo operation entered by the first user on a first user document version of the base document, wherein the base document is concurrently being edited by a non-first user via a non-first user version of the base document in a collaborative editing environment;
recursively condensing all non-first user operations occurring to the base document through the collaborative editing environment that are intermediate the most recently performed undo operation and the undo request in a sequentially order stack of operations relative to the base document to create a condensed server operation; and
applying, at the first user document version of the base document, an inverted version of the most recently performed user undo operation to redo the most recently performed user undo operation prior to executing the condensed server operation.

10. The method of claim 9, further comprising marking the inverted version of the most recently performed user undo operation as a redo operation in a document operation history prior to executing the condensed server operation.

11. The method of claim 9, wherein creating the condensed server operation comprises concatenating the non-first user operations that are intermediate the most recently performed undo operation and the redo request.

12. The method of claim 9, wherein recursively condensing all intervening operations to create the condensed server operation starts from a closest in sequence undo-redo operation pair within the sequentially ordered stack of operations.

13. The method of claim 10, wherein the sequentially ordered stack of operations is stored at a central server.

14. The method of claim 9, wherein the first user document version of the base document is in the same state during the most recently performed user undo operation and during application of the inverted version of the most recently performed user undo operation.

15. A client device for implementing an undo operation in a collaborative editing environment comprising:
a memory;
one or more processors configured to execute instructions stored in the memory, the instructions comprising:
receiving an undo request from a first user to perform an undo operation of a most recently performed do operation entered by the first user on a first user document version of a base document, wherein the base document is concurrently being edited by a non-first user via a non-first user version of the base document in a collaborative editing environment,
recursively condensing all non-first user operations occurring to the base document through the collaborative editing environment that are intermediate the most recently performed do operation and the undo request in a sequentially ordered stack of operations relative to the base document to create a condensed server operation; and
applying, at the first user document version of the base document, an inverted version of the most recently performed user do operation to undo the most recently performed user do operation prior to executing the condensed server operation.

16. The client device of claim 15, wherein the one or more processors are further configured to execute instructions further comprising:
communicating the inverted version of the most recently performed user operation to a central server; and
marking the inverted version of the most recently performed user operation as an undo operation in a document operation history located at the central server.

17. The client device of claim 15, wherein the one or more processors are further configured to execute instructions further comprising:
determining whether the inverted version of the most recently performed user operation may be applied to a current state of the first user document version of the base document.

18. The client device of claim 15, wherein the first user document version of the base document is in the same state during the most recently performed user do operation and during application of the inverted version of the most recently performed user do operation.

* * * * *